United States Patent

[11] 3,577,195

[72] Inventor Charles E. Clift
Phoenix, Ariz.
[21] Appl. No. 815,933
[22] Filed Apr. 14, 1969
[45] Patented May 4, 1971
[73] Assignee Sperry Rand Corporation

[54] SERVOED METER APPARATUS
13 Claims, 4 Drawing Figs.
[52] U.S. Cl. .................................................. 343/108,
318/584, 318/585, 318/650, 324/99, 340/27,
340/195
[51] Int. Cl. ..................................................... G01r 17/06
[50] Field of Search........................................... 343/108;
324/99, 146; 318/584, 585, 650; 73/188; 340/195,
27 (NAV)

[56] References Cited
FOREIGN PATENTS
194,949 6/1967 U.S.S.R. ....................... 324/99

Primary Examiner—Rodney D. Bennett, Jr.
Assistant Examiner—Richard E. Berger
Attorney—S. C. Yeaton ABSTRACT: Apparatus for positioning an indicator in accordance with a control signal including a D'Arsonval-type meter movement having an auxiliary AC excitation winding on the field magnet thereby providing both a unidirectional and an alternating flux field for the meter movement magnetic circuit. The meter armature has two windings, one being excited by a control signal and reacting with the unidirectional field to displace the armature and the other operating to sense both the displacement of the armature and the rate of change of said displacement by reacting respectively with the alternating and unidirectional fields. When included in a closed-loop servosystem the meter movement operates as both a servodrive and an angular motion transducer providing displacement and rate feedback terms.

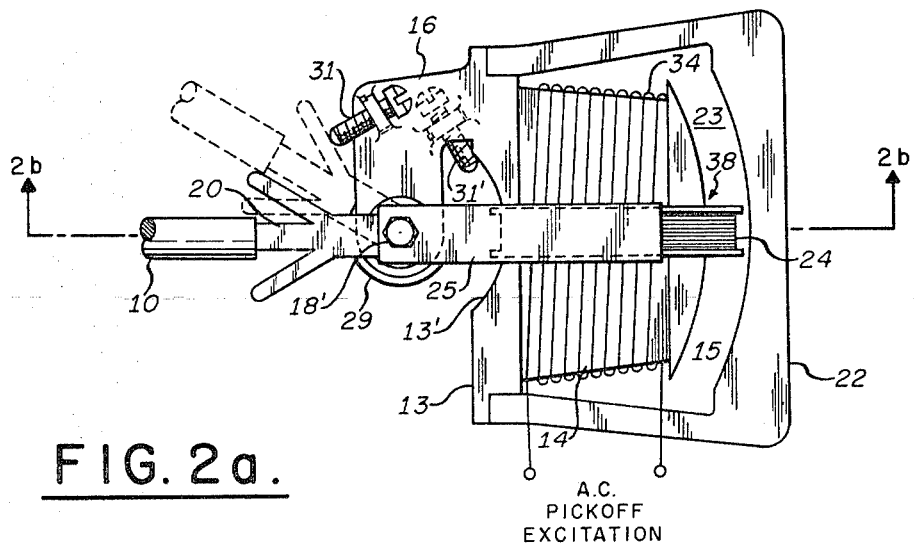
FIG. 2a.
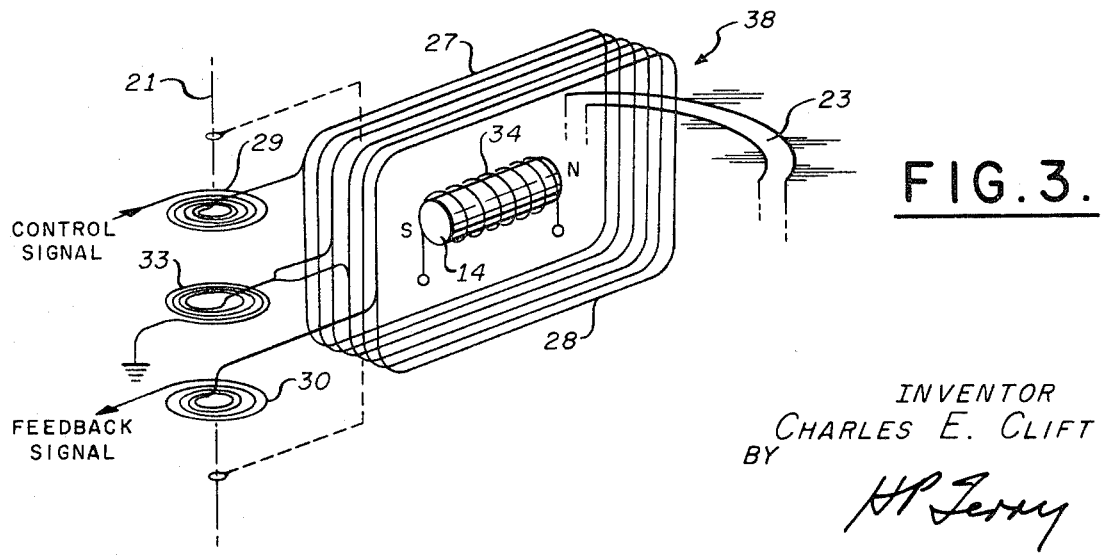
FIG. 2b.
FIG. 3.
INVENTOR
CHARLES E. CLIFT
BY
ATTORNEY

SERVOED METER APPARATUS

BACKGROUND OF THE INVENTION

1. Field of the Invention

The present invention relates to meter mechanisms and more particularly to meter movements operated in a closed-loop servo fashion. Accordingly, a well-damped servoed indicator is provided by arranging and constructing the magnetic core and armature assembly of a meter movement so that it operates not only as a drive member for the indicator, but also as an angular motion sensor providing both displacement and rate feedback signals. While the invention may be employed in many different embodiments in which it is desired to provide accurate displacement of an indicator in accordance with a control signal, it will be described herein in connection with the command pointers of an aircraft flight director instrument.

2. Description of the Prior Art

The function and operation of a flight director in an aircraft control system is disclosed in detail in U.S. Pat. Nos. 2,613,350 and 2,613,352, assigned to the same assignee as the present invention. As disclosed in those patents, certain basic flight control parameters are combined such that if the pilot controls the aircraft in roll and pitch in a manner to maintain the pointers of the display instrument centered or zeroed, the aircraft will asymptotically approach and thereafter maintain a predetermined flight path. The control signal referred to hereinafter may, for exemplary purposes, comprise a signal output of the computer shown in the above-mentioned patents and the meter movement of the display instrument herein disclosed may replace the pointer actuator mechanism depicted in the patents. For purposes of illustrating the present inventive concept, only one of the command pointers and its controlling electronics is disclosed in detail, it being understood that other pointer mechanisms may be substantially identical thereto and indeed other pointers or indicators of a modern flight director indicator may be similarly controlled.

SUMMARY OF THE INVENTION

In accordance with the teaching of the present invention, an indicator pointer is accurately displaced relative to a reference or zero index in an accurate, high response, well damped manner by use of closed-loop or feedback servo techniques, the pointer driver or meter movement of the invention providing not only the driving force for the pointer, but also both the displacement and rate feedback terms required by a high performance closed loop system.

In a preferred embodiment of the invention, a permanent magnet is positioned relative to a horseshoe shaped magnetic core in a manner to establish a uniform DC magnetic field across an airgap between the core and magnet, the flux lines running through the core structure back into the end of the magnet remote from the airgap. An AC excited coil wound around the magnetic core establishes an alternating flux field in the airgap in substantially collinear alignment with the DC field. An eccentrically pivoted armature assembly comprising control and pickoff coils positioned to move in the airgap is driven by means of a command signal applied to the control coil. As the armature assembly rotates, a varying DC signal is produced in the pickoff coil by virtue of its windings cutting through the DC flux field. This DC signal has an amplitude and polarity determined respectively by the rate and direction of the displacement of the armature assembly. At the same time, as the armature rotates, the pickoff coil becomes coupled to the AC flux field and thereby has induced in it an AC signal having an amplitude and phase dependent on the magnitude and direction of displacement of the armature. The DC and AC signals induced in the armature pickoff coil constitute respective rate and displacement feedback signals which are degeneratively combined with the command signal applied to the armature control coil.

The armature and pointer are normally biased by means of leaf springs connected to the armature coil windings such that in a nonoperating condition the pointer is held off scale or out of view against a stop affixed to the magnetic core structure. In operation then, the closed-loop servo operation provided by the displacement and rate feedback signals holds the pointer at a zero or center position in the absence of a command signal being applied to the armature control winding. This feature of the apparatus is utilized as explained in the following detailed description to detect various malfunctions that may arise during the course of operation.

BRIEF DESCRIPTION OF THE DRAWINGS

FIG. 2a is a top plan view of the meter mechanism shown in FIG. 1;

FIG. 2b is a sectional view of the meter mechanism taken along a plane passing through the meter pointer pivot axis and the longitudinal axis of the permanent magnet affixed to the meter core structure; and FIG. 3 is an exploded view in perspective form depicting the armature assembly and leaf spring arrangement of the meter mechanism.

DESCRIPTION OF THE PREFERRED EMBODIMENT

Figure 1:
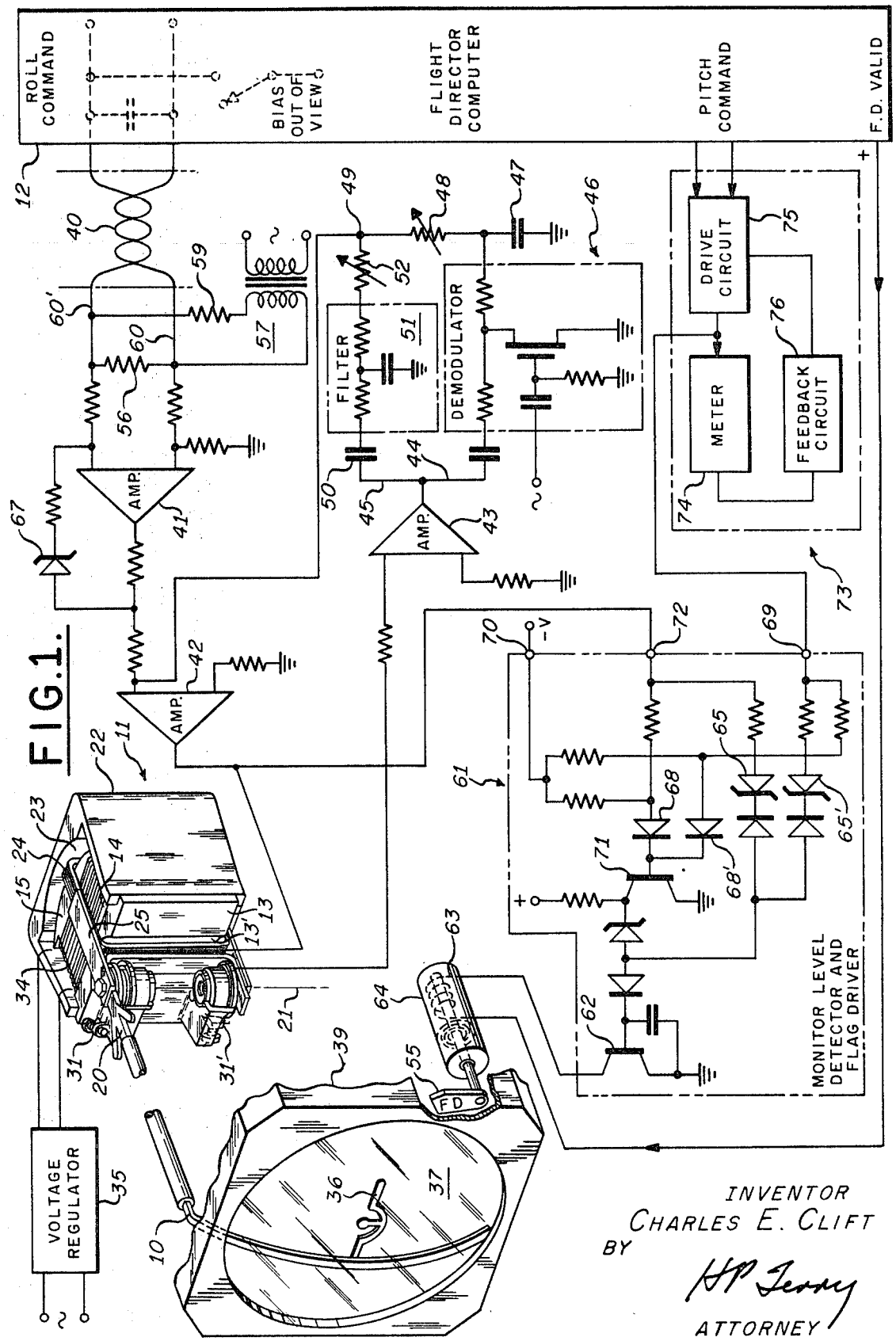
FIG. 1 is a perspective view of a meter mechanism and associated control circuits constructed in accordance with the present invention and shown in relation to a flight director computer and indicator therefor.

Referring to FIGS. 1, 2a and 2b, roll pointer 10 is positioned laterally relative to a zero reference index 36 in the face 37 of a flight director indicator by means of a meter movement 11 of the eccentrically pivoted D'Arsonval-type in accordance with a roll command signal supplied from flight director computer 12. The meter movement comprises s conventional magnetic core arrangement having a base portion 13 of magnetically permeable material to which is secured a permanent magnet 14 having north and south poles as shown, the free or north end of the magnet 14 being provided with an arcuate pole piece 15. Integrally formed on meter base 13 are bearing support bridges 16 and 17 having respective conventional jewel and pivot bearing assemblies 18 and 19 that define the pivot axis 21 of the meter. The support end of pointer 10 is secured to a U-shaped balance crossarm 20, the vertically spaced arms of which support the bearing pins 18' and 19' of jewel bearing pivot assemblies 18 and 19. A horseshoe-shaped keeper 22 of magnetically permeable material has its open arms secured in magnetically permeable relation to base 13 and its closed end arcuately shaped to conform to the pole face 15. Thus, pole face 15 and the internal surface of keeper 22 define an arcuate shaped airgap 23 having a radius of curvature referenced to the pivot axis 21. Likewise, surface 13' of base 13 also has a radius of curvature referenced to the pivot axis so as to provide freedom of movement between balance crossarm 20 and armature assembly 38.

The armature assembly comprises an open rectangular frame or bobbin 24 rigidly secured to a pivot frame comprising extension members 25 and 26 connected to balance arm 20 so as to be rotatable about the pivot axis and having wound thereon for movement therewith two separate coils 27 and 28 as shown in FIG. 3, the coils surrounding the magnet core such that convolutions of each lie in and move through the airgap as the pointer rotates about the pivot axis. In the zero or undeflected position of the armature, the coils are collinear with the longitudinal axis of magnet 14.

Associated with each pivot bearing assembly are conventional hairsprings 29 and 30 arranged to bias balance arm 20 and pointer 10 fully against meter stop 31 so that in the unenergized condition of armature winding 27 the pointer is held out of view behind mask 39 of the flight director indicator and thus cannot be seen by the pilot. Stop 31' limits motion of the pointer in the opposite direction. Springs 29 and 30 are also used to conduct electrical energy to armature coils 27 and 28 respectively, as shown schematically in FIG. 3. The coils have a common connection 32 which may be brought out of the armature assembly by means of a flex-lead or pigtail but is preferably connected through a third hairspring 33.

From the foregoing description, it will be evident that the core and magnet structure of the meter movement 11 defines a relatively uniform unidirectional magnetic flux field 39 which is substantially collinear with the axis of the permanent magnet. In accordance with the present invention an additional alternating magnetic flux field is generated which is substantially coextensive with the magnetic field produced by magnet 14. The alternating field flux is produced by coil 34 wound around magnet 14 and excited from a suitable source of accurately regulated 400 cycle alternating current supplied from a precision voltage regulator 35 which is necessary to ensure a good linear and thermally stable feedback signal, as will be described hereinafter.

In operation, meter movement 11 positions the pointer 10 is accordance with the polarity and magnitude of a DC control signal supplied from flight director computer 12 to armature control coil 27 through interaction of the magnetic flux field provided by magnet 14. Rotation of the armature assembly thereby couples armature pickoff coil 28 to the alternating magnetic flux field produced by AC excitation winding 34. As a result an alternating signal is induced in armature winding 28 having a phase and amplitude proportional to the direction and magnitude through which the armature is displaced from its quiescent position of alignment with the longitudinal axis of magnet 14. In addition, since the convolutions of pickoff coil 28 in airgap 23 cut through the unidirectional field therein, a DC signal component is also generated therein, the signal being proportional in polarity and amplitude to the direction and magnitude of the rate of change of the displacement.

From the foregoing, it will be appreciated that the meter movement hereinabove described may also be employed as a position transducer in which case the armature control coil 27 is either eliminated or left unenergized and the armature frame 24 is mechanically connected to any device, the angular rate and position of which are to be detected for the purpose of providing a composite signal proportional thereto.

When used in an aircraft flight director apparatus, meter movement 11 positions pointer 10 in a closed-loop servo fashion in accordance with a displacement command signal, such as a roll command signal from the flight director computer 12. This command signal is a DC signal supplied from the remote computer 12 over suitable transmission leads 40 to the panel-mounted flight director indicator. The signal is suitably amplified in preamplifier 41 and drive or output amplifier 42 for application to control winding 27 of meter movement 11. Displacement and rate feedback signal components are generated in winding 28, as described above, and supplied to feedback amplifier 43, the output of which is divided into two branches, a displacement branch 44 and a rate branch 45 where the respective feedback signal components are detected. The alternating signal component proportional to pointer position is demodulated in chopper demodulator 46 which is referenced to the same 400 cycle supply as AC excitation winding 34, the resulting DC pulses being smoothed by capacitor 47 and applied through scaling potentiometer 48 to summing junction 49. The DC component of the feedback signal from pickoff winding 28 is supplied through coupling capacitor 50, filter 51 and scaling potentiometer 52 to summing junction 49 where it is combined with the DC displacement signal. The rate channel is designed to pass a discrete DC level or change of DC level within the dynamic frequency range of meter movement 11. Since the 400 cycle pickoff frequency is appreciably beyond this range, it is decoupled by filter 51 whereby the instantaneous DC level is passed and the 400 cycle component is filtered to ground. Scaling potentiometers 48 and 52 are adjusted to provide the desired displacement and rate response characteristics of pointer 10. If desired, potentiometers 48 and 52 may be replaced with fixed resistors suitably selected to give the desired response and in practice this will usually be the case. The combined displacement and feedback signals are summed in degenerative fashion with the command signal at the input of power amplifier 42 in the forward loop thereby reducing the output of amplifier 42 to a very low value, that is, with just enough error signal to overcome the slight spring bias produced by the hairsprings as described above.

By virtue of the fact that meter movement 11 is positioned by a closed-loop position servo, coupled with a spring bias which, in an unenergized condition maintains the pointer 10 out of view against a hardover stop, overall system monitoring may be readily accomplished. Most of the failures which are monitored by means of the present invention will result in a greater than normal signal at the output of meter drive amplifier 42. For detecting such larger than normal signals a monitor level detector and warning flag driver circuit 61 is provided. This circuit is of conventional design comprising an output transistor 62 which controls the energization of flag meter coil 63 of flag meter 64. Flag meter 64 is normally spring biased so that when it is deenergized warning flag 55 pops into view from behind mask 39. Power terminal 70 of the level detector is connected to a negative voltage supply which normally holds transistor 71 in a nonconducting state so that transistor 62 is conductive and the flag meter coil is connected through the collector to emitter terminals thereof to ground. When a signal of either polarity applied to level detector input terminal 72 from the output of drive amplifier 42 exceeds a predetermined threshold, transistor 62 becomes nonconducting and removes excitation from the meter flag coil. In the case of a positive signal exceeding the threshold, transistor 71 is turned on and transistor 62 shutoff by virtue of current flowing through diode 68. The same action occurs in the case of a negative signal exceeding the threshold as a result of conduction through Zener diode 65. This arrangement enables all the important causes of system failure to be monitored.

Continuity monitoring of transmission line 40 is accomplished by inducing a 400 cycle signal across the input load resistor 56 of amplifier 41 by using a transformer 57 for DC isolation. Most flight director computers have a very low output impedance usually obtained by connecting a large capacitance 58 across the computer output terminals. The secondary winding of transformer 57 is connected in series with resistance 59 and both are connected across resistor 56. Thus, if either input lead 60 or 60' from the flight director opens, the 400 cycle signal will no longer be shorted out but instead will be fully developed across resistor 56. The presence of a large AC signal across resistor 56 drives amplifier 41 into saturation causing level detector 61, which is connected to sense the input to the meter control coil 27, to remove excitation from the warning flag meter drive coil 63 thereby displaying flag 55 and at the same time biasing pointer 10 out of view. Thus, an open circuit on transmission leads 40 can be discriminated from a normal zero command supplied by flight director computer 12.

Another failure readily monitored by the present system relates to either the occurrence of mechanical interference between pointer 10 and other mechanical elements of the flight indicator or a condition wherein the pointer becomes stuck to the stop which may occur due to contamination of the stop elements. In the event either of these malfunctions occurs, the signal level at the output of drive amplifier 42 will increase in response to an increase in either the command voltage of the feedback voltage and again actuate level detector 61 so as to pop the warning flag. The same operation and results will obtain if an open circuit develops in one or both of the meter armature coils 27 and 28 or if the flight director computer fails. In the latter instance, the flight director flag will pop as a result of the flight director valid signal on lead 66 in series with the flag meter coil 63 and transistor 62 reducing to zero.

There are times during the operation of a flight director when the pilot may desire for one reason or another to bias the flight director pointer 10 out of view intentionally without displaying the warning flag. Most flight director computers provide a large negative voltage for this purpose, the voltage being supplied over the normal flight director output leads. In the present arrangement this bias out of view signal acts as a normal input to the system. The value of the bias signal may vary depending upon the computer design but in any case is large enough to drive the pointer into its stops. It has already been stated, however, that a signal great enough to drive the indicator into a stop will result in a failure indication. To preclude this, the bias signal is limited by Zener diode 67 connected in a feedback path around preamplifier 41. Zener diode 67 prevents the bias signal from reaching its full value, the actual limit value thereof being just sufficient to hold the pointer out of view through normal servo operation but not against stop 31. Thus, the output of amplifier 42 is maintained at a low value so that excitation is maintained on the flag meter coil.

Control of a pointer (not shown) driven by a pitch command signal from the flight director computer is accomplished in the same manner by a separate unit 73 comprising a meter 74 and associated drive and feedback circuits 75 and 76. The output of the drive circuit in the pitch control unit is connected to input terminal 69 of the level detector wherein Zener diode 65' and diode 68' respectively respond to negative and positive pitch drive signals exceeding a prescribed level for the purpose of removing excitation from flag meter coil 63 so as to cause flag 55 to pop into view.

While the invention has been described in its preferred embodiment, it is to be understood that the words which have been used are words of description rather than limitation and that changes may be made without departing from the true scope and spirit of the invention in its broader aspects.

I claim:

1. An electromagnetic transducer comprising:
a D'Arsonval-type meter structure having a magnetic core means arranged to define a unidirectional magnetic flux field,
means coupled with said core means for producing an alternating magnetic flux field substantially coextensive with said unidirectional flux field,
an armature winding mounted for movement relative to said core means and having convolutions thereof adapted to be displaced through said flux fields, and
means coupled with said winding for displacing the same whereby there is induced in said winding an alternating current signal component having a phase and amplitude proportional to the direction and magnitude of said displacement through interaction with said alternating magnitude flux and a direct current signal component of polarity and amplitude proportional to the direction and magnitude of the rate of change of said displacement through interaction with said unidirectional magnetic flux.

2. The transducer as set forth in claim 1 wherein said winding displacing means comprises a further armature winding mounted integrally and substantially coextensive with said first mentioned armature winding and means for supplying a direct current displacement control signal to said further winding whereby both said armature windings are displaced through interaction with said unidirectional field in accordance with the polarity and amplitude of said control signal.

3. Apparatus for positioning an indicator pointer in closed-loop servo fashion in accordance with the control signal comprising:
meter movement means of the D'Arsonval-type having a magnetic core means for producing a unidirectional magnetic flux field, means coupled with said core means for producing an alternating magnetic flux field substantially coextensive with said unidirectional magnetic flux field, and a pivotally mounted armature means including a pair of coils having convolutions thereof adapted to move in both of said flux fields,
means supplying a reversible polarity, variable magnitude DC control signal to one of said coils for displacing said armature through the reaction of said unidirectional magnetic field in accordance with the sense and magnitude of said control signal and thereby displacing said other coil with respect to said alternating magnetic field whereby there is induced therein an alternating current having a phase and amplitude proportional to the direction and magnitude of said displacement through reaction with said alternating magnetic field, and
means coupled with said other coil for supplying a servoloop feedback signal proportional to said armature displacement.

4. The apparatus as set forth in claim 3 wherein a DC signal is produced in said other coil proportional to the rate of change of said displacement through reaction with said unidirectional field and further including means responsive to said DC component for supplying a further servoloop feedback signal proportional to the rate of movement of said armature.

5. Apparatus for positioning an indicator comprising: meter movement means of the D'Arsonval-type including magnetic core means for producing a unidirectional magnetic field, means coupled with said core means for producing an alternating magnetic field substantially collinear with said unidirectional magnetic field, and pivotally mounted armature means having first and second coils so arranged and constructed that convolutions of each are adapted to move across both of said magnetic fields,
driver means having input terminals for receiving a reversible polarity, variable magnitude DC command signal and an output terminal connected to the first coil to provide a control signal thereto for displacing the armature through reaction with the unidirectional magnetic field in accordance with the magnitude and sense of the control signal whereby the second coil is displaced with respect to the alternating magnetic field so that there is induced therein through reaction with the alternating magnetic field an AC feedback signal having a frequency corresponding to that of the alternating magnetic field and an amplitude and phase proportional to the magnitude and direction of said displacement and through reaction with said unidirectional magnetic field a DC feedback signal having an amplitude and polarity proportional to the rate of change and direction of said displacement, and
feedback means coupling the second coil to the first coil such that the AC and DC feedback signals are degeneratively combined with the command signal.

6. The apparatus of claim 5 wherein the feedback means includes means for converting the AC feedback signal to a proportional DC converted signal having a polarity determined in accordance with the phase of the AC signal relative to the alternating magnetic field, and a filter connected in parallel with the converter means, said filter operating to pass the DC feedback signal and block the AC feedback signal.

7. The apparatus of claim 6 further including means for biasing the armature means such that the indicator is held out of view against a stop affixed to the meter movement in an unenergized state of the meter movement, and level detector means connected to the output terminal of the driver means for sensing a condition whereat the signal applied to the first coil exceeds a predetermined magnitude of either polarity.

8. The apparatus of claim 6 further including level detector means connected to the output terminal of the driver means for sensing a condition whereat the signal applied to the first coil exceeds a predetermined magnitude of either polarity.

9. The apparatus of claim 8 wherein the driver means includes means for limiting its response to the DC command signal to preclude the indicator from being driven against the stop.

10. The apparatus of claim 8 further including a DC command signal source connected to the driver means, said source having a low AC output impedance, and means for coupling an AC fault detector signal to the input terminals of the driver means, said AC fault detector signal being normally short-circuited by said low AC output impedance and effective to provide a signal at the output of the driver means in excess of said predetermined magnitude upon the occurrence of an open circuit in the connection between the driver means and the DC command signal source.

11. The apparatus of claim 10 wherein the driver means includes means for limiting its response to the DC command signal.

12. The apparatus of claim 11 wherein the DC command signal source is a flight director computer and further including a flag meter comprising an actuator and warning flag coupled to the level detector means, the actuator being responsive to a signal from the level detector means for displaying the warning flag when the control signal exceeds said predetermined magnitude.

13. The apparatus of claim 12 further including means connecting the flight director computer to the flag meter actuator for displaying the warning flag upon occurrence of failure in the flight director computer.